United States Patent

Keim et al.

[11] Patent Number: 5,715,647
[45] Date of Patent: Feb. 10, 1998

[54] DEVICE FOR THE FORMATION OF A LONGITUDINAL SEAM OF A TUBULAR FOIL

[75] Inventors: Dieter Keim, Langgoens; Harald Braun, Gruenberg; Werner Schneider, Hohenahr; Walter Baur, Gruendau, all of Germany

[73] Assignee: Rovema Verpackungsmaschinen GmbH, Fernwald, Germany

[21] Appl. No.: 551,550

[22] Filed: Nov. 1, 1995

[30] Foreign Application Priority Data

Nov. 2, 1994 [DE] Germany .................. 44 39 104.8

[51] Int. Cl.$^6$ .................. B65B 9/20; B65B 51/18; B65B 51/26
[52] U.S. Cl. .................. 53/374.5; 53/551; 493/302
[58] Field of Search .................. 53/551, 550, 451, 53/450, 552, 374.5, 374.3, 371.4, 376.2; 493/302; 219/243, 244

[56] References Cited

U.S. PATENT DOCUMENTS

| | | |
|---|---|---|
| 2,800,162 | 7/1957 | Rohdin .................. 53/374.5 X |
| 3,315,439 | 4/1967 | Pierre .................. 53/374.5 |
| 3,385,028 | 5/1968 | Pierce .................. 53/374.5 |
| 4,123,312 | 10/1978 | Schmid et al. .................. 493/302 X |
| 4,136,505 | 1/1979 | Putnam, Jr. et al. .................. 53/551 |
| 5,085,036 | 2/1992 | Evans et al. .................. 493/302 X |

*Primary Examiner*—James F. Coan
*Attorney, Agent, or Firm*—Flynn, Thiel, Boutell & Tanis, P.C.

[57] ABSTRACT

In a device for the formation of the longitudinal seam of a tubular foil, a flexible foil is placed around a formatting tube by means of a formatting shoulder. The device has a transporting device for moving of the foil and the formed tubular foil. The invention provides two opposingly rotating sealing bands which are pressed against one another clamping the two longitudinal edges o the foil for welding of the longitudinal seam of the tubular foil. One of the sealing bands can be heated by means of a heating device. Both sealing bands can be heated and the device designed as a tubular bagging machine. The invention has the advantage that the deflection of the longitudinal seam from its true path is avoided.

20 Claims, 3 Drawing Sheets

DEVICE FOR THE FORMATION OF A LONGITUDINAL SEAM OF A TUBULAR FOIL

FIELD OF THE INVENTION

The invention relates to a device for the formation of a longitudinal seam on tubular foil. The device has a forming shoulder which places flexible foil around a formatting tube, a transporting device for forwarding the foil and the formatted tubular foil, and a device for welding the longitudinal seam.

BACKGROUND OF THE INVENTION

It is known to use in such devices a rotating heatable sealing band as the mechanism for welding the longitudinal seam. This sealing band is utilized in continuously operating tubular bagging machines. It moves at the same speed as the tubular foil.

The conventional devices have the disadvantage that the rotating sealing band always applies a sealing pressure onto two stacked foil areas by pressing the foil areas against a stationary base. This causes two different forces to be applied to the two foil areas that are to be welded to one another resulting in the foil being deflected from its intended path. The pressing force of the rotating sealing band acts from the one side onto the two foil areas of the longitudinal edges. Since the sealing band moves at the same speed as the foil, the only adhering force is a static friction between the sealing band and the surface of the foil. The surface area of the foil which is pressed by the sealing band against the stationary base experiences a sliding friction. Since the static friction is greater than the sliding friction, the resultant force acts to deflect the foil areas that are to be welded from their intended path, and hereby the foil does not follow its correct course.

SUMMARY OF THE INVENTION

The basic purpose of the invention is to provide a device for welding a longitudinal seam on foil in which the friction forces are the same on both sides of the foil area, so the foil will follow its correct course. The device for welding the longitudinal seam has two sealing bands. One sealing band replaces the static base. The sealing bands press against one another clamping the two longitudinal edges of the foil while rotating in opposite directions. At least one sealing band can be heated by means of a heating device thereby welding the foil areas to create the longitudinal seam.

The device of the invention has the advantage that the two sealing bands apply a static friction onto the overlapped longitudinal edges of the foil from both sides. The friction forces are the same on both sides, thus a resultant force is not created and the foil remains on its intended path.

The device is easily integrated with a vertical tubular bagging machine, particularly where the bagging machine has a formatting tube on which the device for welding of the longitudinal seam may be mounted.

The invention has another advantage, namely, a longitudinal-seam welding can occur quicker when both sealing bands can be heated. Heat can be introduced by both sealing bands onto the two opposite sides in the longitudinal welding zone. The sealing bands do not require as high a temperature for welding the seam as the single sealing band system used in the past. The heat is more evenly distributed throughout the foil area. Thus, it is possible to reduce the heat used to weld the two foil ends. Therefore, the weld will solidify faster.

When the two sealing bands rotate in one plane tangentially with respect to the formatting tube, it is achieved that the sealing bands are easily accessible, and that they can weld a well known fin seam.

An overlapping seam can be welded when both sealing bands rotate in one plane radially with respect to the formatting tube, whereby one sealing band is provided inside of the formatting tube and one sealing band is provided outside of the formatting tube. The sealing band placed within the formatting tube does not require any additional space outside of the fill tube and results in a particularly compact design. A product can be filled through the formatting tube into the end of the tubular foil at the end of the formatting tube without interfering with the functioning of the sealing band in the formatting tube when the sealing band arranged inside of the formatting tube is surrounded by a dust shield. Product will not settle on the dust shield when the dust shield is sloped at its upper end. A product deposit inside of a formatting tube would have several disadvantages. On one hand, deposited product portions would, when the product has been weighed, result in a worsening of the dose exactness. On the other hand, when the product is being changed for another product, it would have the result that deposited product would be mixed with the new product or that the deposited product portion would have to be removed before a new product could be packaged.

A tightly welded seam requires both sufficient heat and sufficient pressure applied to the thermoplastic. This is achieved by applying pressure onto a straight partial piece of at least one sealing band, thereby providing sufficient pressure onto the welding area. Only the straight part of the sealing band contacts the foil. It is possible to utilize either a longer partial piece for applying the pressure, or a relatively short piece on a wheel guiding the sealing band for applying the pressure. Another means for applying the pressure is a jaw cushioned by at least one spring. The force of the spring applies a constant pressure along the entire jaw length. The jaw slides against the inside of the rotating sealing band. Instead of the sliding jaw, wheels which roll along the inside of the rotating sealing band are also conceivable. If the sliding jaw is designed as a heat-sealing jaw, then the pressure application and the heating of the sealing band is accomplished by a single compact device.

The sealing band can be guided and driven around two wheels aligned parallel with one another. The wheels can have profiling on their outer surface in order to guide the sealing band and to prevent the sealing band from slipping off from the wheel. It is sufficient for the drive of the sealing band to drive merely one wheel. However, when certain uses require larger axial forces acting on the tubular foil, it is sensible to drive both wheels. When at least one wheel axis is cushioned by means of a spring, sufficient sealing pressure is applied to the sealing band. The spring force transfers onto the straight sections of the rotating sealing band due to the mechanical tension of the sealing band.

The heating device for the sealing band can consist of a voltage source plus two sliding contacts connected to the poles of the voltage source at one end and contacting the sealing band at another end. The advantage of this heating device is current can heat the sealing band directly and spontaneously. The current and the resistance of the sealing band determine thereby the sealing-band temperature. The heating device consists of a voltage source, two sliding contacts connected to the poles of the voltage source and slidably contacted to the axes of the two wheels, and electrically conducting wheels. The current is here guided from a pole of the voltage source to a sliding contact, then onto the axle of a wheel, and through the electrical conducting wheel onto the area of the sealing band contacting this wheel. The current is conducted through the two straight areas of the sealing band onto the second wheel and from the second wheel through to the second wheel axis and second sliding contact to the other pole of the voltage source. Thus, the sealing band is completely heated and has available a relatively large amount of heat. This heating device prevents relatively cool areas from occurring on the sealing bands, as occurred in the past at the area boundaries when a sealing band was heated only in certain areas.

A further minimization of force differences at the longitudinal seam of a tubular foil is achieved when one wheel of each of the two sealing bands is driven at the same speed by separate motors. The sealing bands apply the same forces on both sides of the two foil areas to be welded together since an equal and synchronously driven sealing-band system acts on both sides.

A synchronization of the two sealing bands is achieved when one of the two wheels of one sealing band is a driving wheel, and when the driving wheel is connected to a wheel with the same diameter as the other sealing band by an octagonally rotating driving belt. Parts are hereby minimized due to the fact only one motor is required to drive both sealing band systems.

The drive motor can be a servomotor, thereby easily controlling the speed and the start-stop times of the sealing band system.

BRIEF DESCRIPTION OF THE DRAWINGS

The invention will be described in greater detail hereinafter in connection with exemplary embodiments and the drawings, in which.

DETAILED DESCRIPTION

Figure 1:
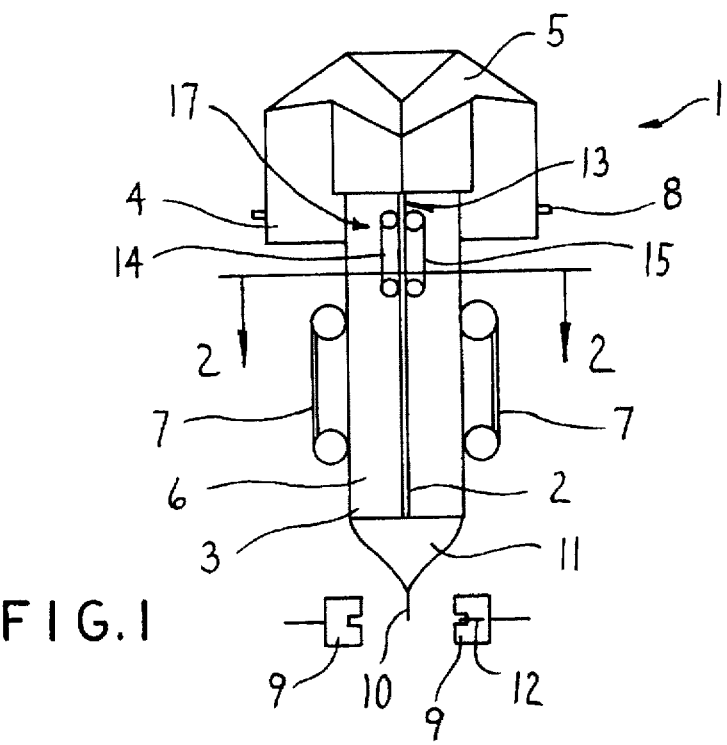
FIG. 1 schematically illustrates a device for the formation of a longitudinal seam on a tubular foil and for the cross-welding of the tubular foil.
Figure 2:
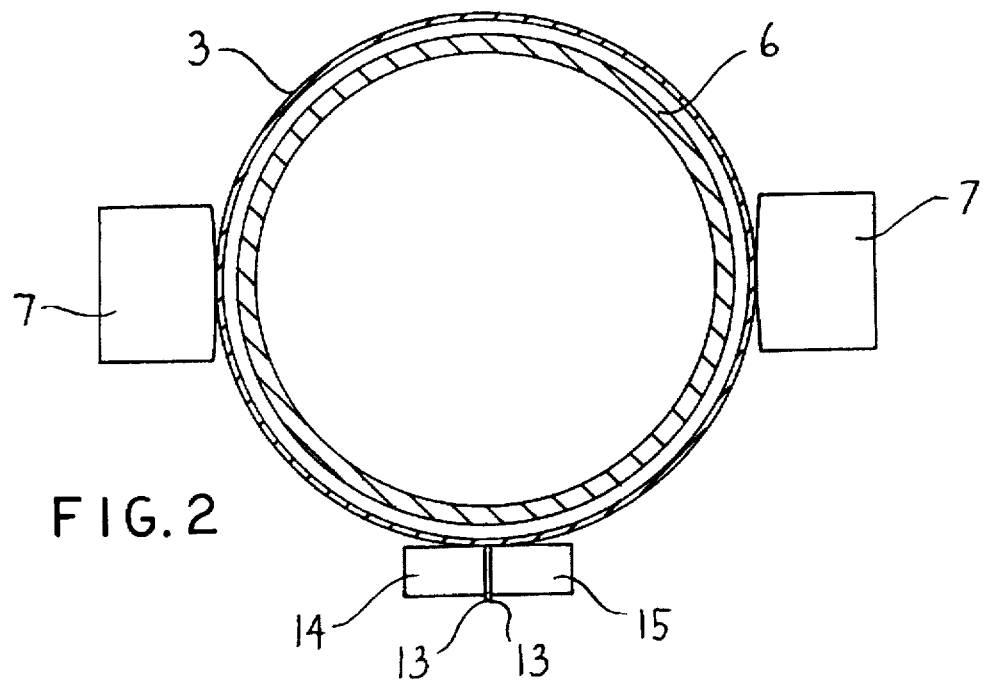
FIG. 2 is a horizontal cross-sectional view taken along the line 2—2 of FIG. 1.
Figure 3:
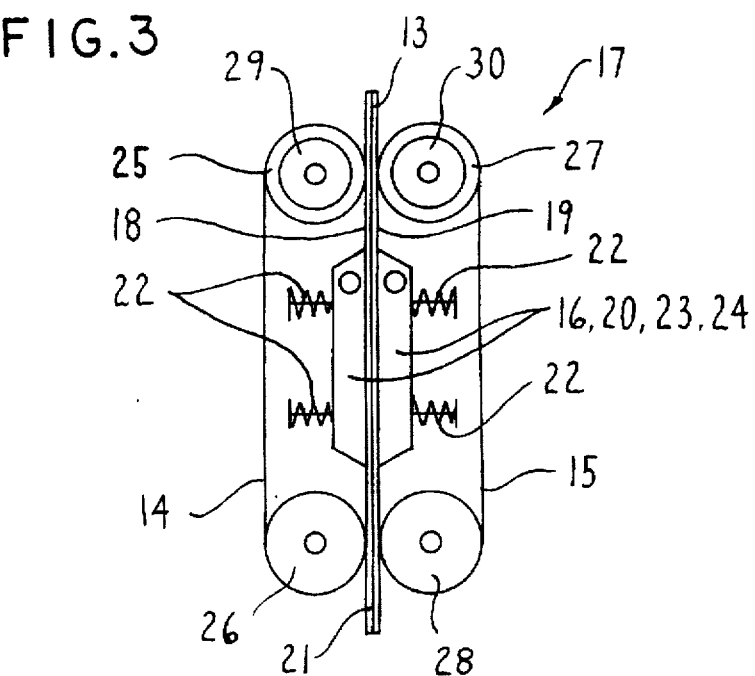
FIG. 3 is a side view of a first embodiment of two rotating sealing bands.

Referring now to FIGS. 1 and 2, a flexible foil 4 is, in a device 1 for the formation of the longitudinal seam 2 on a tubular foil 3, placed around a formatting tube 6 by a forming shoulder 5. The device 1 has a transporting device 7 for moving the foil 4 wound up onto a roller 8 and the formed tubular foil 3. In order to create the cross-seams of bags, cross-sealing tools 9 are provided which weld together both the top and also bottom seams 10. The created bags 11 are filled with product through the formatting tube 6. The created bags 11 are separated from the tubular foil 3 by cutting with a knife 12. Two opposingly rotating sealing bands 14, 15 are pressed against one another, thereby clamping the two longitudinal edges 13 of the foil 4, for welding together the longitudinal seam 2 of the tubular foil 3. Both sealing bands 14, 15 rotate in one plane tangentially with respect to the formatting tube 6. Each sealing band 14, 15 has a heating device 16 for welding the longitudinal seam 2 together, as shown in FIG. 3. Means 20 for applying pressure onto the welding area 21 are provided by straight partial pieces 18, 19 of the sealing bands 14, 15. The means 20 for applying pressure are jaws 24 cushioned by means of springs 22. The jaws can be designed as heat-sealing jaws 23. Each sealing band 14, 15 runs around two wheels 25, 26, 27, 28 aligned parallel to one another. Of the wheels 25, 26, 27, 28 of the two sealing bands 14, 15, a wheel 25, 27 is driven by a motor 29, 30. The servomotors rotate in opposite direction and run always with the same speed with respect to each other, however the speed of both motors can be changed.

Figure 4:
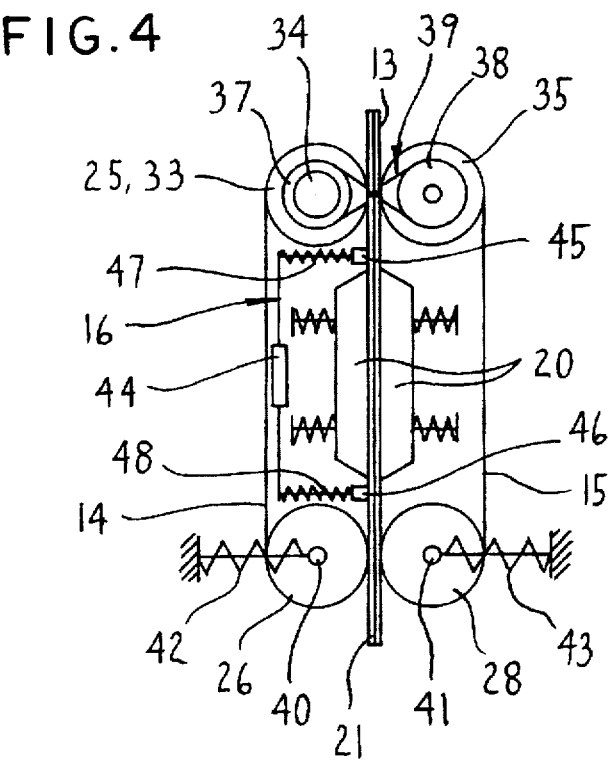
FIG. 4 is a side view of a second embodiment of two rotating sealing bands.

One wheel 25 of the two wheels 25, 26 of a sealing band 14 is a drive wheel 33 in a further exemplary embodiment, shown in FIG. 4. The driving wheel 33 is driven by a motor 34. One wheel 35 of the other sealing band 15 with the same diameter as the wheel 33 is coupled through rollers 37, 38 with the wheel 33, rollers 37, 38 are the same size and are rigidly connected to the wheels 33, 35. Thus, the wheel 33 functions as the drive wheel of sealing band 15 driving the rotating driving belt 39 connected to wheel 35 through a figure eight path (FIG. 4). Thus, the wheels 33, 35 are driven at the same speed, however, the wheels are turning in opposite directions.

Each respective wheel axle 40, 41 of respective wheels 26, 28 is cushioned by means of a spring 42, 43.

The heating device 16 consists of a voltage source 44 and two sliding contacts 45, 46 connected to the poles of the voltage source 44 and contacting the inside of the sealing band 14. The sliding contacts 45, 46 are pressed against the sealing band 14 by means of springs 47, 48. A current flow through the sealing band 14 occurs, whereby the sealing band 14 is heated up.

Figure 5:
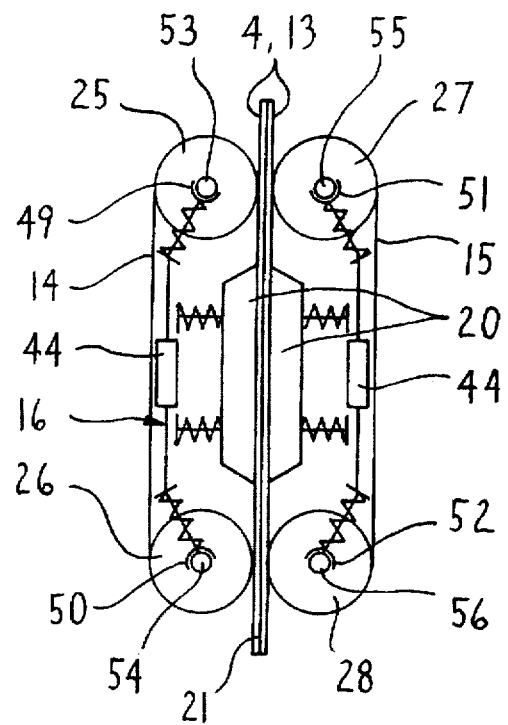
FIG. 5 is a side view of a third embodiment of two rotating sealing bands welding the plastic-foil areas together.

As shown in FIG. 5, the heating device 16 consists of a voltage source 44 and two bent sliding contacts 49, 50, 51, 52 connecting the poles of the voltage source 44 to wheel axles 53, 54, 55, 56. The sliding contacts 49, 50, 51, 52 slide on the wheel axles 53, 54, 55, 56 of the electrically conducting wheels 25, 26, 27, 28. Both sealing bands 14, 15 are electrically heated in this exemplary embodiment.

Figure 6:
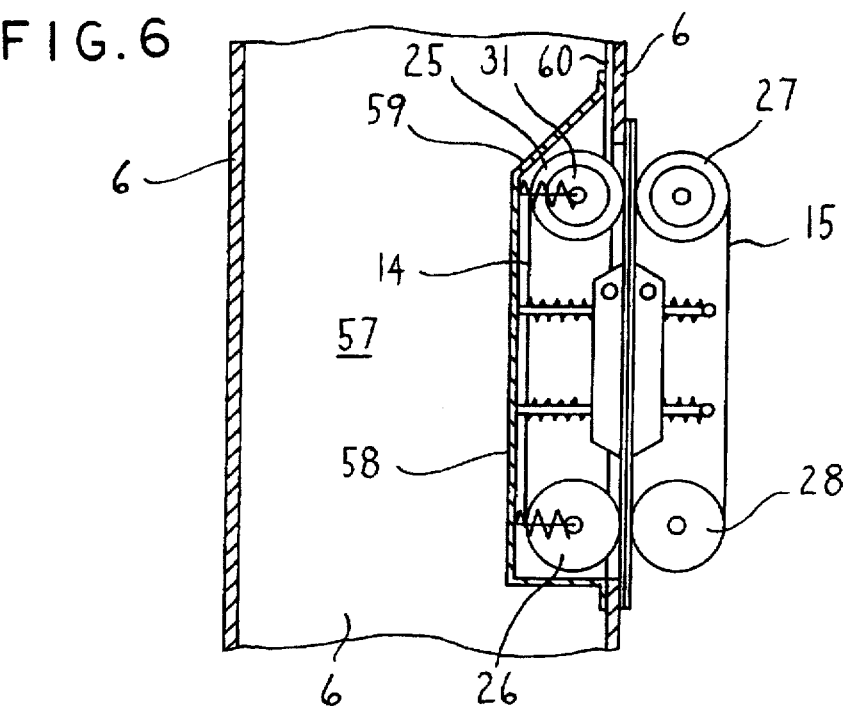
FIG. 6 is a vertical cross-sectional view of a formatting tube and the two sealing bands of FIG. 3.

The two sealing bands 14, 15 rotate in one plane radially with respect to the formatting tube 6, in the last exemplary embodiment as shown in FIG. 6. One sealing band 14 is thereby provided inside 57 of the formatting tube 6 and one sealing band 15 is provided outside of the formatting tube 6. The sealing band 14 arranged in the interior 57 of the formatting tube 6 is surrounded by a dust shield 58. The dust shield 58 has an incline 59 at its upper end so that fill material will not settle on the dust shield 58 when the material is poured through the formatting tube 6. The supply lines for the servomotor 31 of the wheel 25 are guided through the channel 60.

Although particular preferred embodiments of the invention have been disclosed in detail for illustrative purposes, it will be recognized that variations or modifications of the disclosed apparatuses, including the rearrangement of parts, lie within the scope of the present invention.

The embodiments of the invention in which an exclusive property or privilege is claimed are defined as follows:

We claim:

1. In a device for the formation at adjacent longitudinal edges of a tubular foil a longitudinal seam, said device comprising a forming shoulder for placing a flexible foil around a formatting tube, a transporting device for moving the foil and the formed tubular foil, and a device for welding the two longitudinal edges together to form the longitudinal seam, the improvement wherein the device for welding the two longitudinal edges consists of two sealing bands pressing against one another and clamping the two longitudinal edges of the foil therebetween, said two sealing bands moving in opposite directions, and wherein a heating device is provided for heating at least one of said sealing bands, the sealing bands each moving around two wheels, the heating device consisting of a voltage source having two sliding contacts each respectively electrically contacting an axle of said two wheels, whereby an electrical circuit is completed for heating said at least one sealing band.

2. In a device for the formation at adjacent longitudinal edges of a tubular foil a longitudinal seam, said device comprising a forming shoulder for placing a flexible foil around a formatting tube, a transporting device for moving the foil and the tubular formed foil and a device for welding the two longitudinal edges together to form the longitudinal seam, the improvement wherein the device for welding the longitudinal edges consists of two sealing bands pressing against one another and clamping the two longitudinal edges of the foil therebetween, said two sealing bands rotating in opposite directions in one plane radially with respect to the formatting tube, one sealing band being provided inside of the formatting tube and one sealing band being provided outside of the formatting tube, the one sealing band arranged inside of the formatting tube being surrounded by a dust shield, and wherein a heating device is provided for heating at least one of said two sealing bands.

3. The device according to claim 2, wherein the dust shield has a slope at its upper end.

4. In a device for the formation at mutually adjacent longitudinal edges of a tubular foil a longitudinal seam, said device comprising a forming shoulder for placing a flexible foil around a formatting tube, a transporting device for moving the foil and the formed tubular foil, and a device for welding the two longitudinal edges together to form the longitudinal seam, the improvement wherein the device for welding the longitudinal edges consists of two sealing bands pressing against one another and clamping the two longitudinal edges of the foil therebetween, said two sealing bands moving in opposite directions, and wherein a heating device is provided for heating both of said sealing bands.

5. The device according to claim 4, wherein the two sealing bands rotate in one plane radially with respect to the formatting tube, whereby one sealing band is provided inside of the formatting tube and one sealing band outside of the formatting tube.

6. The device according to claim 1, wherein the device is a part of a vertical tubular bagging machine, where the device for welding of the longitudinal seam is provided on the formatting tube.

7. The device according to claim 4, wherein the two sealing bands rotate in one plane tangentially with respect to the formatting tube.

8. The device according to claim 1, wherein a means for applying pressure onto the sealing band and onto a welding area of the foil is provided on at least one straight part of said sealing bands.

9. The device according to claim 8, wherein the means for applying pressure is a jaw cushioned by at least one spring.

10. The device according to claim 9, wherein the jaw is a heat-sealing jaw.

11. The device according to claim 1, wherein the sealing bands rotate around two parallel wheels.

12. The device according to claim 11, wherein at least one wheel axle is cushioned by a spring.

13. The device according to claim 1, wherein the heating device consists of a voltage source having poles, and two sliding contacts connected to the poles of the voltage source and contacting both sealing bands.

14. The device according to claim 11, wherein the heating device consists of a voltage source having poles and two sliding contacts having two ends, one end being connected to the poles of the voltage source and the other end slidably contacting the wheel axles of the two wheels around which the sealing bands rotate, and the wheels are electrically conducting.

15. The device according to claim 11, wherein one wheel of the wheels of the two sealing bands is driven by a motor, and the sealing bands are driven at the same speed.

16. The device according to claim 11, wherein one wheel of the two wheels of one sealing band is a drive wheel driven by a motor, and wherein said one wheel is of the same diameter as a wheel of the other sealing band and is connected to the drive wheel by means of a drive belt moving along a generally figure eight path such that the drive wheel and the wheel of the other sealing band rotate in opposite directions.

17. The device according to claim 15, wherein a servomotor is provided as the motor.

18. The device according to claim 16, wherein a servomotor is provided as the motor.

19. In a device for the formation at adjacent longitudinal edges of a tubular foil a longitudinal seam, said device comprising a forming shoulder for placing a flexible foil around a formatting tube, a transporting device for moving the foil and the formed tubular foil, and a device for welding the two longitudinal edges together to form the longitudinal seam, the improvement wherein the device for welding the longitudinal edges consists of two sealing bands pressing against one another and clamping the two longitudinal edges of the foil therebetween, said two sealing bands moving in opposite directions, the two sealing bands moving in one plane tangentially with respect to the formatting tube, and wherein a heating device is provided for heating at least one of said sealing bands.

20. In a device for the formation at adjacent longitudinal edges of a tubular foil a longitudinal seam, said device comprising a forming shoulder for placing a flexible foil around a formatting tube, a transporting device for moving the foil and the formed tubular foil, and a device for welding the two longitudinal edges together to form the longitudinal seam, the improvement wherein the device for welding the two longitudinal edges consists of two sealing bands pressing against one another and clamping the two longitudinal edges of the foil therebetween, said two sealing bands moving in opposite directions, wherein a heating device is provided for heating at least one of said sealing bands, wherein the heating device consists of a voltage source having poles, and wherein two sliding contacts are connected to the poles of the voltage source and contact the one sealing band.

\* \* \* \* \*

UNITED STATES PATENT AND TRADEMARK OFFICE
CERTIFICATE OF CORRECTION

PATENT NO. : 5 715 647
DATED : February 10, 1998
INVENTOR(S) : Dieter KEIM et al It is certified that error appears in the above-indentified patent and that said Letters Patent is hereby corrected as shown below:

Column 5, line 50; change "claim 1" to ---claim 4---; and
line 57; change "claim 1" to ---claim 4---.
Column 6, line 1; change "claim 1" to ---claim 4---; and
line 5; change "claim 1" to ---claim 4---.

Signed and Sealed this

Fifth Day of May, 1998

Attest:

BRUCE LEHMAN

Attesting Officer

Commissioner of Patents and Trademarks